United States Patent
Clarke et al.

(10) Patent No.: US 9,553,973 B2
(45) Date of Patent: Jan. 24, 2017

(54) APPARATUS AND METHOD FOR DISCLOSING PRIVACY CONDITIONS BETWEEN COMMUNICATION DEVICES

(75) Inventors: Michael Frederick Harness Clarke, Waterloo (CA); Sanjay Kalyanasundaram, Kitchener (CA); Calvin Roex, Waterloo (CA)

(73) Assignee: BlackBerry Limited, Waterloo (CA)

( * ) Notice: Subject to any disclaimer, the term of this patent is extended or adjusted under 35 U.S.C. 154(b) by 401 days.

(21) Appl. No.: 13/240,719

(22) Filed: Sep. 22, 2011

(65) Prior Publication Data

US 2013/0078962 A1 Mar. 28, 2013

(51) Int. Cl.
*H04M 1/725* (2006.01)
*H04M 1/60* (2006.01)

(52) U.S. Cl.
CPC ....... *H04M 1/72552* (2013.01); *H04M 1/6041* (2013.01); *H04M 1/72569* (2013.01); *H04M 2203/2038* (2013.01); *H04M 2203/5081* (2013.01); *H04M 2203/609* (2013.01); *H04M 2203/654* (2013.01)

(58) Field of Classification Search
CPC .............. H04M 1/72519; H04M 1/271; H04M 1/72552; H04M 1/72569; H04M 1/03; H04M 1/6008; H04M 1/6041; H04M 1/642; H04M 1/72541; H04M 1/72583; H04M 3/42212; H04M 19/045; H04M 1/68; H04M 2003/2038; H04M 2250/02; H04M 3/42; H04M 1/7253; H04M 1/0202; H04M 7/7253; H04W 12/06; H04W 12/12; H04W 24/10; H04W 4/023; H04W 4/06; H04W 4/18; H04W 4/206; H04W 4/22; H04W 76/002; H04W 84/12; H04W 8/005; H04W 4/02; H04L 29/12301; H04L 65/1059; G06Q 30/0267; G06Q 30/0269; G06Q 30/0257
USPC ..... 455/41.2, 226.1, 226.3, 296, 297, 414.1, 455/418, 419, 501, 550.1, 566, 569.1, 455/569.2, 570
See application file for complete search history.

(56) References Cited

U.S. PATENT DOCUMENTS

| 6,795,544 | B1 | 9/2004 | D'Arcy et al. |
| 7,734,034 | B1 | 6/2010 | Coughlan et al. |
| 2007/0123202 | A1* | 5/2007 | Cho .............................. 455/403 |
| 2007/0287491 | A1 | 12/2007 | Cradick et al. |

(Continued)

FOREIGN PATENT DOCUMENTS

| EP | 1011252 A2 | 6/2000 |
| EP | 1684493 A2 | 7/2006 |

(Continued)

*Primary Examiner* — George Eng
*Assistant Examiner* — Jing Gao
(74) *Attorney, Agent, or Firm* — Jenna L. Wilson; Wilson Lue LLP (57) ABSTRACT

An apparatus and a method is provided for detecting a privacy condition in a communication device and disclosing the privacy condition to a second communication device. A privacy condition is detecting in the communication device, wherein the privacy condition is a condition that can affect the privacy of a call. The privacy condition can be the enablement of a speakerphone, the detection of a non-private environment, or the detection of a nearby electronic signal. Thereafter, during an active call, a notice of the privacy condition is sent to the second communication device. A privacy condition can be displayed in response to receiving a privacy condition message from the second communication device.

20 Claims, 5 Drawing Sheets

(56) References Cited

U.S. PATENT DOCUMENTS

2008/0089513 A1\* 4/2008 Kotzin et al. ............ 379/420.01
2008/0242265 A1\* 10/2008 Cohen ............... H04M 1/72519
                                                          455/411
2010/0106504 A1     4/2010 Agrawal et al.
2012/0052872 A1\* 3/2012 Do ........................... G01S 5/18
                                                          455/456.1

FOREIGN PATENT DOCUMENTS

WO       2010/142344 A1    12/2010
WO    WO 2012/001216 A1 \*  1/2012  ............ G06F 17/30
WO    WO 2012/037725 A1 \*  3/2012  ............ H04W 4/02

\* cited by examiner

APPARATUS AND METHOD FOR DISCLOSING PRIVACY CONDITIONS BETWEEN COMMUNICATION DEVICES

The present disclosure relates generally to a communication device, such as a telephone, cellular phone, smart phone, or other wired or wireless device that may be used in a communication system. More particularly, the present disclosure relates to an apparatus and a method for detecting and disclosing a privacy condition between communication devices.

BACKGROUND OF THE DISCLOSURE

Communication devices can be used to transmit voice and other forms of data between locations. Many communication devices are wireless devices, such as cellular telephones, smart phones, and tablet computers. Communication devices can also include computers, laptop computers, and other data processing devices, which can use Internet Protocol to communicate voice (e.g., Voice over Internet Protocol, or Voice over IP, or VoIP), text, images, video, data files, command and control information, and other forms of data.

One problem with voice communication (e.g., phone calls) between communication devices, and particularly between wireless devices, is that they are frequently made when one or more parties to the conversation is not in a private environment. For instance, many people can be put in an awkward social situation when a call is answered when a speakerphone is enabled on the communication device, or when the audio of the call is broadcast through the audio system of an automobile when the caller did not realize that other parties were present in the car. Also, the caller can benefit from knowing if the called party is driving, or in a restaurant, etc., so that the called party can avoid awkward conversations between friends and strangers alike about the overheard conversation on the phone.

Another problem with not knowing whether a party to the call is in a non-private situation can occur when the non-private party tries to end the call, or change the subject, or otherwise avoid a conversation, because someone else can hear part or all of the conversation. In this case, the other party to the call can feel ignored, or discouraged, or avoided, or hurried off the call. Also, the situation can be hard for the non-private party to explain on the phone in the presence of another person who is listening but not a party to the call.

There are other times when the calling party should end the call and let the called party concentrate on more important items, or let the called party get to a place where it is easier to conduct a conversation later. For example, if a calling party knew that the called party was in a subway station, and needs to pay attention, the calling party could easily end the conversation and call back later.

Similarly, phone calls received while at a restaurant, a party, a sports event, or other activity can be inconvenient for the called party. The call can be difficult to hear, or it can be difficult to talk clearly, or it can be difficult to talk privately. If the called party is driving a car, or conducting an activity that makes it difficult to hold a telephone, or focus on a conversation, the calling party may want to call back later.

Thus, calls may be more efficient if a calling party understood the context of the called party. In view of these deficiencies in the operation of communication devices, and wireless devices in particular, an improved apparatus and method for disclosing privacy conditions between communication devices is needed. It is in view of this background information related to the design and use of a communication device the significant improvements of the present disclosure have evolved.

DETAILED DESCRIPTION

An embodiment of the present disclosure advantageously provides an apparatus and a method for disclosing privacy conditions between communication devices. The disclosure generally relates to communication devices, such as a wireless device like a cellular phone, smart phone, tablet computer, and other similar electronic devices that are capable of providing voice communication. Some embodiments of the disclosure can be implemented using wired, or wireline communication devices, such as, for example, devices capable of communicating voice over Internet Protocol, or a conventional wireline telephone (e.g., a POTS telephone).

For simplicity and clarity of illustration, reference numerals may be repeated among the figures to indicate corresponding or analogous elements. Numerous details are set forth to provide an understanding of the embodiments described herein. Some embodiments may be practiced without these details. In other instances, well-known methods, procedures, and components have not been described in detail to avoid obscuring the embodiments described. The description should not be considered as limited to the scope of the embodiments described herein.

Figure 1:
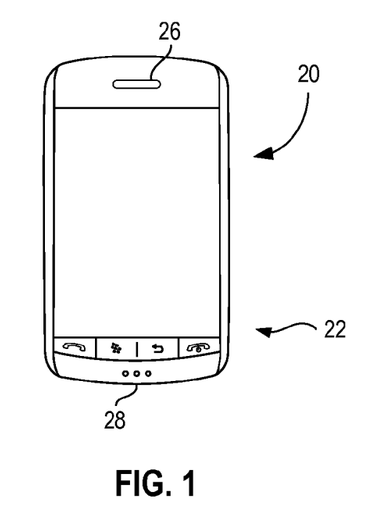
FIG. 1 illustrates a communication device, such as a wireless device.

Referring first to FIG. 1, a representative communication device, wireless device 20, is depicted. Examples of wireless device 20 can include cellular telephones, smart phones, tablet computers, computers, and other data processing devices capable of supporting a voice communication session. Wireless device 20 may also be able to communicate text data, image data, video data, data files, command and control information, and the like.

Wireless device 20 can include buttons or keyboard 22, which can be used by a user to operate wireless device 20 by selecting various menus and functions. Data, menus, and functions of wireless device 20 can also be displayed and selected (or otherwise manipulated) using display 24. In some embodiments, display 24 can be a touch screen, which can be sensitive to human touch or input with a stylus. In other embodiments, keyboard 22 can be a display of keys or buttons arranged on display 24. Keyboard 22 and display 24 can be used together to enter text data into wireless device 20. In other embodiments, keyboard 22 can be a full keyboard.

Figure 2:
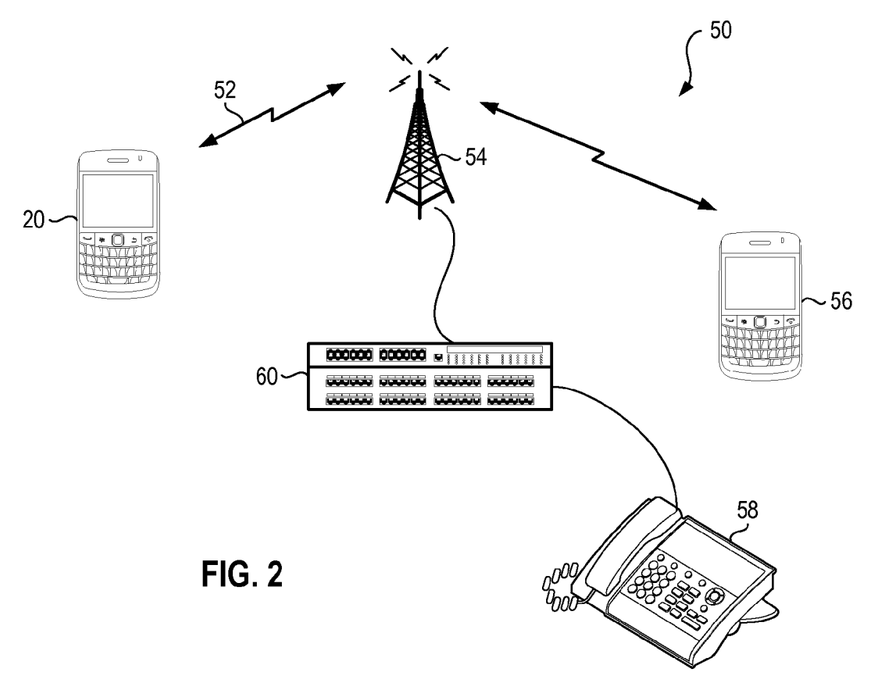
FIG. 2 is a schematic representation of a communication system in which the wireless communication device shown in FIG. 1 can operate.

Referring now to FIG. 2, there is depicted communication system 50, which can include communication devices, such as wireless device 20. Wireless device 20 can have a wireless communication link 52 with base station 54. Wireless device 20 can operate in a communication session, such as a telephone call, with other devices in communication system 50, wherein the other device can be referred to as a second or other communication device. For example, wireless device 20 can be in a voice or data communication session with wireless device 56, which device can be similar to wireless device 20. Alternatively, wireless device 20 can be in a communication session with telephone 58, which can be coupled to base station 54 by switch 60. Telephone 58 can be a conventional wireline (POTS) telephone, or telephone 58 can be a communications device capable of having a voice-over-Internet-Protocol telephone call. In other example embodiments, wireless device 20 can be in a communications session with a computer or server (not shown).

Switch 60 can be capable of switching (e.g., connecting) voice communication sessions or data communication sessions, wherein telephone conversations are supported by voice communication sessions (i.e., a voice call), and file transfers, web browsing, multimedia data sessions, or the like can be supported by data communication sessions (i.e., a data call). In some embodiments, switch 60 can have functions and signaling capabilities that support the apparatus and method disclosed herein. Additionally, the methods and apparatus disclosed herein can be implemented within a single device on one end of a communications session, or can be implemented between two communication devices on both ends of a communication session, wherein one or more devices can each implement methods, and have apparatus, similar to those disclosed herein. Also, some functions used to implement the apparatus and methods disclosed herein can be implemented in a server, which can be within, or connected to, switch 60.

Figure 3:
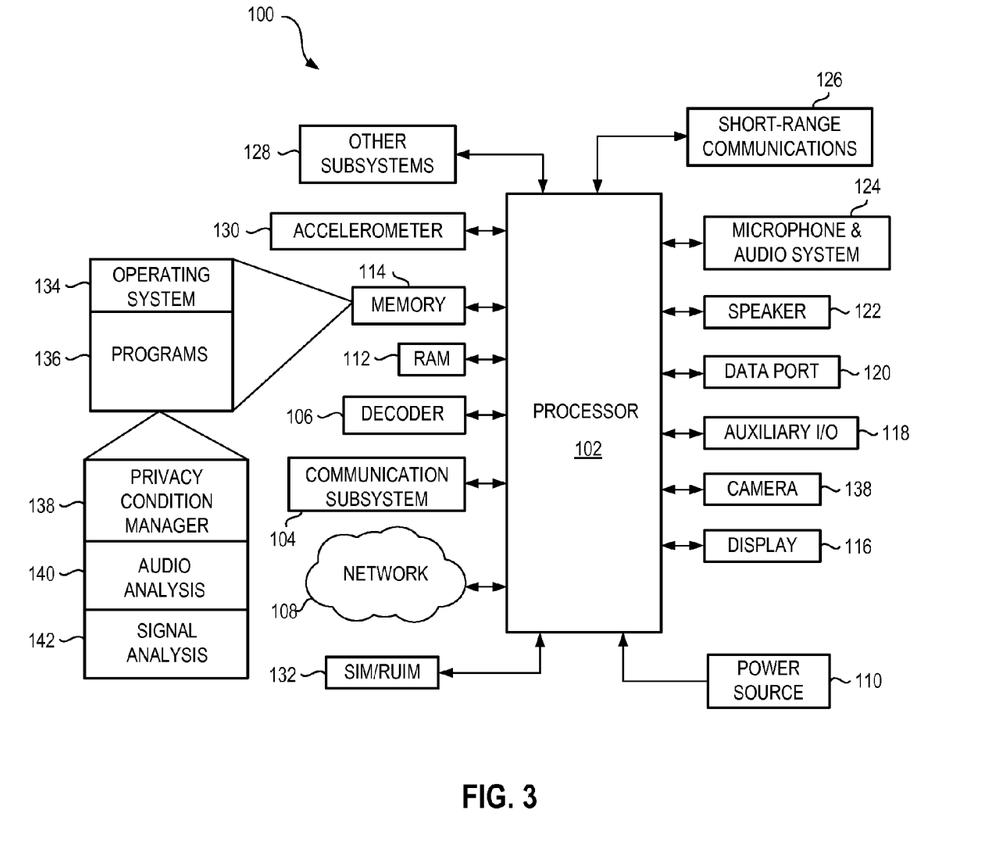
FIG. 3 depicts a high-level functional block diagram of an electronic assembly for operation of the wireless communication device shown in FIG. 1.

FIG. 3 depicts a high-level functional block diagram of an electronic assembly 100 for operating a communication device, such as wireless device 20 shown in FIG. 1. Electronic assembly 100 can include multiple components, such as processor 102, which can control the overall operation of wireless device 20 using various combinations of hardware, software, and firmware. Communication functions provided by wireless device 20 can include voice, data, and command communications, which may be performed by communication subsystem 104. Communication subsystem 104 can be used to initiate and support an active call. Communication subsystem 104 can include various combinations of hardware, software, and firmware to perform a designed function. The software can be functionally or conceptually divided into software modules. And software in one module may share or call upon functions in other modules.

Data received by wireless device 20 can be processed (e.g., decompressed and decrypted) by decoder 106. Communication subsystem 104 can receive messages from, and send messages to, network 108, which can be a wired or wireless network. Communication subsystem 104 can help initiate and operate an active call, wherein wireless device 20 is in a real-time voice communication session. Wireless network 108 may be any type of wireless network, including, but not limited to, a cellular network, a wireless data network, a wireless voice network, and a network that supports both voice and data communications. If network 108 is a wireless network, it can use a variety of formats, such as those specified by standards including Global System for Mobile Communications (GSM), Code division multiples access (CDMA), wireless Ethernet (Institute of Electrical and Electronics Engineers standard 802.11), Wi-Fi, and other similar standards and wireless networks.

Power source 110 can provide power to operate wireless device 20, and can be implemented with one or more rechargeable batteries, or a port or connector to an external power supply, wherein such power supply provides the appropriate power to all components of electronic assembly 100.

Processor 102 can interact with other components, such as random access memory (RAM) 112, memory 114, display 116 (illustrated in FIG. 1 as display 24), auxiliary input/output (I/O) subsystem 118, data port 120, speaker 122, microphone and audio system 124, short-range communications subsystem 126, and other subsystems 128. A user can enter data and operate functions of wireless device 20 with a data input device coupled to processor 102. Data input devices can include buttons or keyboard 22 (see FIG. 1), or, in some embodiments, a graphical user interface produced on display 116, which can use touches and gestures detected using a touch-sensitive overlay on display 116. Processor 102 can interact with keyboard 22 and/or the touch-sensitive overlay via an electronic controller (which can be represented by other subsystems 128). As part of the user interface, information, such as text, characters, symbols, images, icons, and other items that may be displayed or rendered on wireless device 20, can be displayed on display 116.

Processor 102 can interact with accelerometer 130, which may be used to detect a direction of gravitational forces, or user-input acceleration forces. In other embodiments, buttons, such as buttons and keyboard 22 in FIG. 1, can be used to operate select functions of wireless device 20.

To identify and authenticate a subscriber for obtaining access to network 108, wireless device 20 can use a subscriber identity module or a removable user identity module (SIM/RUIM) card 132. Alternatively, user identification information can be programmed into memory 114.

Wireless device 20 can include operating system 134 and software programs 136, which can both be executed by processor 102. Operating system 134 and software programs 136 can be stored in a persistent, updatable store, such as memory 114. Additional applications or programs can be loaded onto wireless device 20 through network 108, auxiliary I/O subsystem 118, data port 120, short-range communications subsystem 126, or any other subsystem 128 suitable for transferring program files.

A received signal, such as a text message, an e-mail message, or web page download can be processed by communication subsystem 104 and input to processor 102. Processor 102 can processes the received signal for output to the display 116 and/or to the auxiliary I/O subsystem 118. A wireless device user may generate data items, for example e-mail messages or data packets, which may be transmitted over network 108 through communication subsystem 104. For voice communications, the overall operation of wireless device 20 can be similar. Speaker 122 can be used to output audible information converted from electrical signals, and microphone and audio system 124 can be used to convert audible information into electrical signals for processing. Speaker 122 can include an earpiece component (as shown in FIG. 1) for private listening, and a loudspeaker component for listening when the phone is not held to the user's ear, or for listening with others nearby wireless device 20. In FIG. 1 the loudspeaker component is not explicitly shown because in many cases it is located on the back of wireless device 20.

Software programs 136 can include software modules, such as privacy condition manager 138, audio analysis module 140, and signal analysis module 142, which are each responsible for a particular function within wireless device 20. Such software modules can call upon various hardware and software resources within wireless device 20 to execute its function.

Privacy condition manager 138 can be used to detect a privacy condition and communicate the privacy condition with another communication device within the communication system. For example, wireless device 20 can use privacy condition manager 138 to detect a privacy condition and communicate the privacy condition with wireless device 56, or communication device 58, wherein the privacy condition can be displayed on their respective displays.

Audio analysis module 140 can be used to analyze sound from the environment of wireless device 20 and estimate a privacy condition related to such environment. In some embodiments, the analysis can be executed within wireless device 20. In other embodiments, some audio analysis can be executed on a subsystem of switch 60 in a client-server model. In yet another embodiment, the audio analysis executed in wireless device 20 can use remote audio from wireless device 56 for analysis of the audio environment of wireless device 56.

Signal analysis module 142 can be used to receive signal information from communication subsystem 104, or from short-range communications subsystem 126, and analyze such signals to determine whether other devices are nearby, which can indicate that other people are nearby, which can, in turn, indicate the privacy condition of being in a non-private environment.

Figure 4:
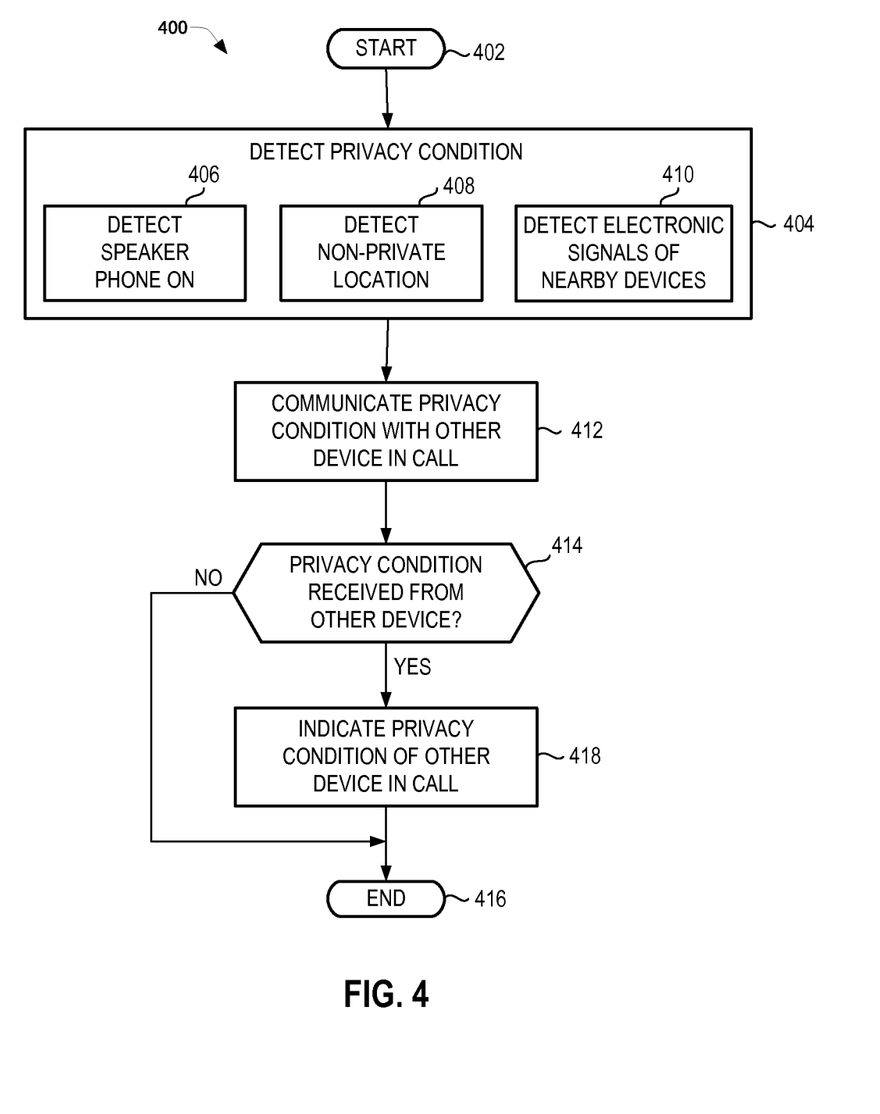
FIG. 4 is a high-level flowchart illustrating a method of disclosing privacy conditions in accordance with an example embodiment of the present disclosure.

Referring now to FIG. 4, there is depicted a high-level flowchart illustrating an exemplary method of disclosing a privacy condition with another communication device in accordance with one example embodiment of the present disclosure. The exemplary method can be controlled by software and executed on hardware shown in FIG. 3. For example, the method may be controlled by privacy condition manager module 138 and executed on processor 102 within electronic assembly 100.

As illustrated, method 400 begins at block 402, and continues at block 404, wherein the method detects a privacy condition. A privacy condition can be any set of circumstances, whether an environmental condition, or a condition in the operating of the communication device, or the like, that can affect the privacy of a voice conversation between communication devices. An example of a privacy condition is being in a non-private environment where someone else can overhear some of the voice conversation of the call.

In flowchart 400, privacy conditions can be detected in one or more of a variety of ways, as shown at block 404. For example, a first way of detecting a privacy condition in the communication device can include detecting the enablement of a speakerphone, as depicted at block 406. A speaker phone being "on" or enabled can affect the privacy of a voice communication because anyone near wireless device 20 may be able to hear the person on the other end of the telephone call. The status of the speakerphone (i.e., loudspeaker) can be examined using privacy condition manager 138 to check the condition of microphone and audio subsystem 124, which can control the speakerphone function.

A second way of detecting a privacy condition in the communication device can include detecting a non-private location, as illustrated at block 408. Detecting a non-private location can be implemented by analyzing sound received at the microphone of wireless device 20 and comparing such sound to sound profiles that can indicate a non-private environment. For example, the sound of a restaurant can be profiled and stored, and when the sound entering the microphone (e.g., sound entering microphone and audio system 124) resembles or correlates with the stored sound profile of the restaurant, a non-private environment can be indicated. This detection of a correlation between sounds and sound profiles may be implemented within wireless device 20 using audio analysis software module 140 and/or microphone and audio system 124. Alternatively, the correlation detection can be implemented in communication system infrastructure, such as, for example, in portions of switch 60 in FIG. 2. If correlation is detected in the infrastructure, environmental sound, or some processed or compressed version of environmental sound can be sent from wireless device 20 to switch 60 via a communication link.

In yet another embodiment, environmental sound (e.g., background sound) from, say, device 56 can be sent to, and remotely analyzed in, wireless device 20.

A third way of detecting a privacy condition in the communication device can include detecting electronic signals of nearby devices, as depicted at block 410. This can be implemented by receiving nearby electronic signals using communication subsystem 104, or short-range communications subsystem 128, and analyzing such signals for indications that another person is nearby, or privacy is otherwise compromised. In one example, signals from a nearby Bluetooth device can indicate that a person with a telephone or a Bluetooth headset is nearby (i.e., within Bluetooth range). In some cases, the name assigned to the Bluetooth device can be used to indicate the name of the person that might be nearby. In other examples, the reception of Wi-Fi signals can indicate that a person with a smart phone or a laptop computer can be nearby. Reception of such short-range signals can be used to indicate a non-private environment.

After the communication device detects one or more privacy conditions, method 400 can communicate the privacy condition with the other communication device in the call, as illustrated a block 412. Communicating the privacy condition can be implemented using communication subsystem 104 to send a message to the other communication device in the call. In one example, such a privacy condition message can include data transmitted using the Unstructured Supplementary Service Data (USSD) protocol for sending messages between communication devices. In another example, the privacy condition message can be sent using a text communication service known as Short Message Service (SMS), or a text message. If text messaging is used, a communication device that can detect and report privacy conditions in accordance with the present disclosure (such as wireless device 20 in FIG. 2) can communicate such privacy conditions with a conventional wireless device (such as device 56 in FIG. 2).

Next, process 400 determines whether or not a privacy condition message has been received from another communication device in the call, as depicted at block 414. If a privacy condition message has not been received, the process passes to block 416, wherein the process of disclosing privacy conditions between communication devices ends.

If, at block 414, a privacy condition message has been received, process 400 indicates the privacy condition of the other communication device in the call, as illustrated at block 418. Indicating a privacy condition can be implemented using display 24 on wireless device 20 to display text, or an icon, or both. Alternatively, indicating a privacy condition can be implemented with sounds (e.g., a chime or tone), lights or LEDs, vibration, or the like.

Figure 5:
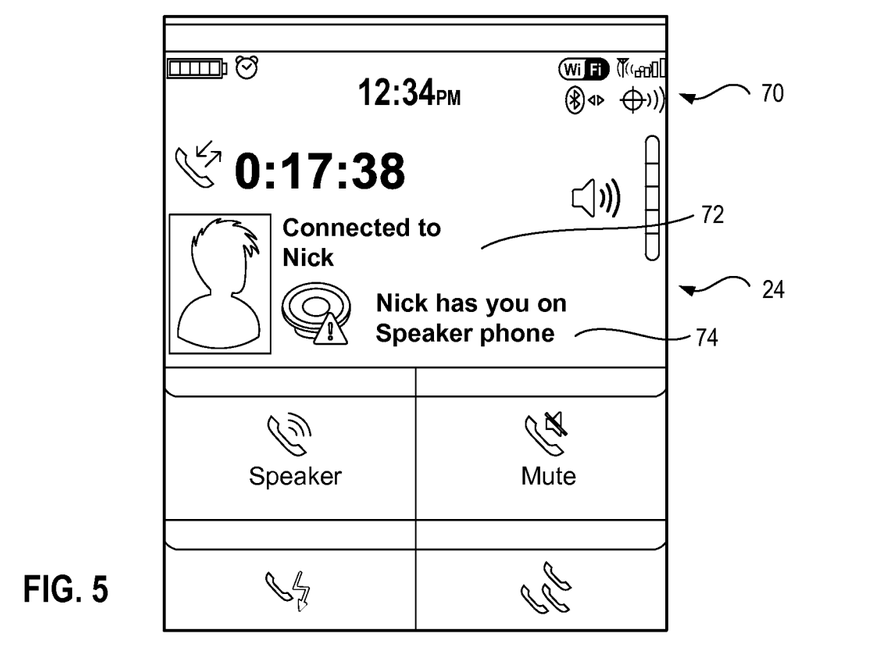
FIGS. 5, 6 and 7 depict a display of the wireless communication device shown in FIG. 1, in accordance with an example embodiment of the present disclosure.
Figure 6:
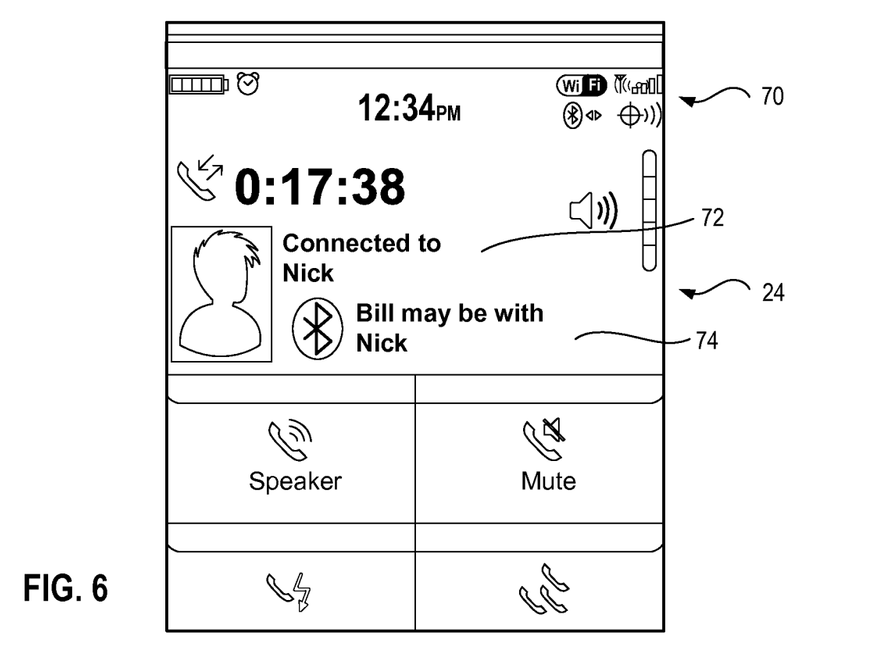
Figure 7:
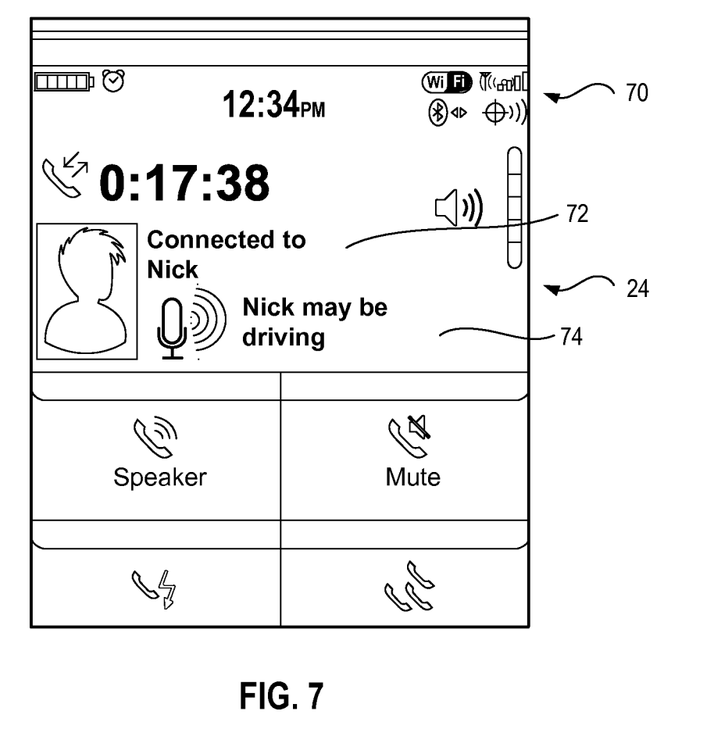

FIGS. 5, 6, and 7 illustrate various indications of privacy conditions that are displayed on an example of a status screen as it may appear during a call on wireless device 20. In FIG. 5, display 24 shows status bar 70, which can indicate status and configuration data, such as battery charge, alarm status, time, Wi-Fi status, cellular signal strength, Bluetooth status, location finding status, and other similar indications. Call indicator label 72 indicates that wireless device 20 is currently in a call with Nick. In accordance with the present disclosure, privacy condition indicator which is a condition that can affect the privacy of the user's conversation with Nick.

In the example of FIG. 6, privacy condition indicator 74 indicates that a Bluetooth signal has been detected near Nick's phone, and a name assigned to that Bluetooth device indicates that the Bluetooth device may belong to Bill. The fact that a Bluetooth device with Bill's name is close enough to Nick's phone for the Bluetooth signals to be detected is a condition that can affect the privacy of the user's conversation with Nick.

And in FIG. 7, privacy condition indicator 74 indicates that sound in the environment of Nick's phone indicates that Nick may be driving, which is a condition that can affect the privacy of the conversation if someone is in the car, or which is a condition wherein Nick can be distracted from driving, which could be a condition where the user should call Nick back at another time.

In other embodiments of the present disclosure, communication device 20 may be a wire line communication device such as telephone 58 (see FIG. 2), which may have a display that can be used to display the privacy condition indicator.

Presently preferred embodiments of the disclosure, and many improvements and advantages thereof, have been described with particularity. The description includes preferred examples of implementing the disclosure, and these descriptions of preferred examples are not intended to limit the scope of the disclosure. The scope of the disclosure is defined by the following claims.

What is claimed is:

1. A wireless device comprising:
   a processor;
   an audio analysis module comprising program code for execution by the processor causing the module to analyze audio received by the wireless device;
   a signal analysis module comprising program code for execution by the processor causing the signal analysis module to analyze wireless communication signal information received by the wireless device;
   a communications subsystem coupled to the processor for conducting a wireless call with a second communication device; and
   a privacy condition manager coupled to the processor, the manager comprising program code for execution by the processor for causing detection of a privacy condition of the wireless device for the wireless call, based on at least:
      a correlation between the audio and a stored sound profile of a non-private location, and
      detection and analysis of nearby wireless communications signals from at least one communication device to obtain an indication that another person may be nearby including a name associated with a nearby wireless communications signal,
   the communication subsystem being adapted to send a privacy condition message including the associated name to the second communication device when the call is active; and
   a display coupled to the processor for displaying a privacy condition received in a privacy condition message from the second communication device.

2. The wireless device of claim 1 wherein the detection of the privacy condition is further based on detected enablement of a speakerphone in the wireless device.

3. The wireless device of claim 1 wherein the privacy condition manager further comprises program code for executing by the processor for detecting whether the wireless device is in a non-private location.

4. The wireless device of claim 1 wherein the audio analysis module is configured to analyze audio received by the second communication device to determine whether the second communication device is in a non-private location.

5. The wireless device of claim 1 wherein the nearby wireless communications signals comprise Wi-Fi signals indicating whether another person can overhear a portion of the wireless call.

6. The wireless device of claim 1 wherein the nearby wireless communications signals comprise Bluetooth signals indicating whether another person can overhear a portion of the wireless call.

7. A method in a wireless device for disclosing a privacy condition, said method comprising:
   detecting a privacy condition at the wireless device, based on at least:
      a correlation between audio received by the wireless device and a stored sound profile of a non-private location, and
      detection and analysis of nearby wireless communications signals from at least one communication device to obtain an indication that another person may be nearby including a name associated with a nearby wireless communications signal;
   during an active call between the wireless device and a second communication device, sending a privacy condition message including the associated name to the second communication device to disclose the privacy condition; and
   displaying, by the wireless device, a privacy condition received in a privacy condition message from the second communication device.

8. The method of claim 7 wherein detecting the privacy condition is further based on detecting an enabled speakerphone in the wireless device.

9. The method of claim 7 wherein detecting the privacy condition is further based on detecting whether the wireless device is in a non-private environment.

10. The method of claim 7 further comprising sending a text warning to the second communication device to disclose the privacy condition.

11. The method of claim 7, further comprising receiving a privacy condition message from the second communication device, and indicating a privacy condition of the second communication device in response to receiving the privacy condition message, wherein the indicating the privacy condition further comprises one of emitting a sound from the wireless device, and displaying the privacy condition on a display of the wireless device.

12. The method of claim 7 wherein the nearby wireless communications signals comprise Wi-Fi signals indicating whether another person can overhear a portion of the wireless call.

13. The method of claim 7 wherein the nearby wireless communications signals comprise Bluetooth signals indicating whether another person can overhear a portion of the wireless call.

14. A non-transitory computer readable medium storing computer program instructions for disclosing a privacy condition, which, when executed by a processor, cause the processor to perform operations comprising:
    detecting a privacy condition of a wireless device, based on at least:
        a correlation between audio received by the wireless device and a stored sound profile of a non-private location, and
        detection and analysis of nearby wireless communications signals from at least one communication device to obtain an indication that another person may be nearby including a name associated with a nearby wireless communications signal; and
    during an active call between the wireless device and a second communication device, sending a privacy condition message including the associated name to the second communication device to disclose the privacy condition; and
    displaying, by the wireless device, a privacy condition received in a privacy condition message from the second communication device.

15. The non-transitory computer readable medium of claim 14 wherein detecting the privacy condition is further based on detecting an enabled speakerphone in the second communication device.

16. The non-transitory computer readable medium of claim 14, wherein detecting the privacy condition is further based on audio analysis detection whether the wireless device is in a non-private environment.

17. The non-transitory computer readable medium of claim 14 wherein the operation of indicating the privacy condition further comprises sending a text warning to the second communication device to disclose the privacy condition.

18. The non-transitory computer readable medium of claim 14 further comprising receiving a privacy condition message from the second communication device, and indicating a privacy condition of the second communication device in response to receiving the privacy condition message,
    wherein the indicating the privacy condition further comprises one of emitting a sound from the wireless device, and displaying the privacy condition on a display of the wireless device.

19. The non-transitory computer readable medium of claim 14 wherein the nearby wireless communications signals comprise Wi-Fi signals indicating whether another person can overhear a portion of the wireless call.

20. The non-transitory computer readable medium of claim 14 wherein the nearby wireless communications signals comprise Bluetooth signals indicating whether another person can overhear a portion of the wireless call.

* * * * *